United States Patent
Gadi et al.

(10) Patent No.: US 11,669,388 B2
(45) Date of Patent: *Jun. 6, 2023

(54) MANAGING THE MIGRATION OF VIRTUAL MACHINES IN THE PRESENCE OF UNCORRECTABLE MEMORY ERRORS

(71) Applicant: VMware, Inc., Palo Alto, CA (US)

(72) Inventors: Sowgandh Sunil Gadi, San Jose, CA (US); Rajesh Venkatasubramanian, San Jose, CA (US); Venkata Subhash Reddy Peddamallu, Sunnyvale, CA (US); Arunachalam Ramanathan, Palo Alto, CA (US); Timothy P Mann, Palo Alto, CA (US); Frederick Joseph Jacobs, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,826

(22) Filed: Oct. 5, 2021

(65) Prior Publication Data

US 2022/0027231 A1    Jan. 27, 2022

Related U.S. Application Data

(63) Continuation of application No. 16/743,895, filed on Jan. 15, 2020, now Pat. No. 11,169,870.

(51) Int. Cl.
*G06F 11/07* (2006.01)
*G06F 9/455* (2018.01)

(52) U.S. Cl.
CPC ...... *G06F 11/0793* (2013.01); *G06F 9/45558* (2013.01); *G06F 11/079* (2013.01);
(Continued)

(58) Field of Classification Search
CPC ............ G06F 11/0712; G06F 11/0727; G06F 11/0751; G06F 11/079; G06F 11/0793; G06F 9/45558; G06F 2009/4557
See application file for complete search history.

(56) References Cited

U.S. PATENT DOCUMENTS 8,903,888 B1 * 12/2014 Hyser ................. G06F 9/45558
                                                                709/212
9,146,818 B2    9/2015 Gotsubo et al.
(Continued)

*Primary Examiner* — Joseph O Schell
(74) *Attorney, Agent, or Firm* — Fountainhead Law Group P.C.

(57) ABSTRACT

Techniques for migrating virtual machines (VMs) in the presence of uncorrectable memory errors are provided. According to one set of embodiments, a source host hypervisor of a source host system can determine, for each guest memory page of a VM to be migrated from the source host system to a destination host system, whether the guest memory page is impacted by an uncorrectable memory error in a byte-addressable memory of the source host system. If the source host hypervisor determines that the guest memory page is impacted, the source host hypervisor can transmit a data packet to a destination host hypervisor of the destination host system that includes error metadata identifying the guest memory page as being corrupted. Alternatively, if the source host hypervisor determines that the guest memory page is not impacted, the source host hypervisor can attempt to read the guest memory page from the byte-addressable memory in a memory exception-safe manner.

21 Claims, 7 Drawing Sheets

(52) U.S. Cl.
CPC ...... *G06F 11/0712* (2013.01); *G06F 11/0727* (2013.01); *G06F 11/0751* (2013.01); *G06F 2009/4557* (2013.01); *G06F 2009/45583* (2013.01)

(56) References Cited

U.S. PATENT DOCUMENTS

| | | | |
|---|---|---|---|
| 9,342,346 B2* | 5/2016 | Maislos | G06F 9/45558 |
| 10,824,466 B2 | 11/2020 | Nider et al. | |
| 2005/0160151 A1* | 7/2005 | Rawson, III | G06F 1/3275 |
| | | | 709/213 |
| 2009/0113109 A1* | 4/2009 | Nelson | G06F 11/1484 |
| | | | 718/1 |
| 2010/0205252 A1* | 8/2010 | Dorai | G06F 9/4856 |
| | | | 709/205 |
| 2011/0145632 A1* | 6/2011 | Waldspurger | G06F 11/08 |
| | | | 714/6.1 |
| 2011/0271152 A1 | 11/2011 | Hattori et al. | |
| 2013/0305007 A1* | 11/2013 | Kawano | G06F 11/073 |
| | | | 711/165 |
| 2014/0089725 A1 | 3/2014 | Ackaret et al. | |
| 2017/0031745 A1* | 2/2017 | Koike | G06F 3/065 |
| 2017/0075706 A1* | 3/2017 | Apfelbaum | G06F 9/45558 |
| 2017/0364387 A1* | 12/2017 | Ahmed | G06F 3/0664 |
| 2018/0089081 A1* | 3/2018 | Ramalingam | G11C 14/0018 |
| 2018/0329737 A1* | 11/2018 | Dong | G06F 9/45558 |
| 2019/0012110 A1* | 1/2019 | Okano | G06F 3/0604 |
| 2019/0034112 A1* | 1/2019 | Tsirkin | G06F 12/1009 |
| 2020/0167180 A1 | 5/2020 | Tsirkin et al. | |
| 2021/0216394 A1 | 7/2021 | Gadi et al. | |

\* cited by examiner

MANAGING THE MIGRATION OF VIRTUAL MACHINES IN THE PRESENCE OF UNCORRECTABLE MEMORY ERRORS

CROSS REFERENCES TO RELATED APPLICATIONS

This application is a continuation of U.S. application Ser. No. 16/743,895 filed Jan. 15, 2020, now U.S. Pat. No. 11,169,870 issued Nov. 9, 2021, entitled "Managing the Migration of Virtual Machines in the Presence of Uncorrectable Memory Errors," the content of which is incorporated herein by reference in its entirety for all purposes.

BACKGROUND

Live migration is a feature supported by various virtualization software platforms (i.e., hypervisors) that enables a virtual machine (VM) to be moved from one host system to another while the VM remains operational. Live migration provides a number of important benefits for virtualized deployments, such as the ability to dynamically load balance compute workloads across host systems and the ability to carry out proactive host maintenance with little or no VM downtime.

One issue with existing live migration implementations is that, at the time a VM is live migrated from a source host system H1 to a destination host system H2, the presence or detection of uncorrectable memory errors in the physical memory backing the VM's guest memory on source host system H1 will cause the live migration process to fail (and in some scenarios, the hypervisor of H1 to crash). This issue has the potential to be particularly troublesome in deployments where that physical memory is implemented using a byte-addressable persistent memory because currently available byte-addressable persistent memory technologies (e.g., phase change memory (PCM), resistive RAM (ReRAM), etc.) exhibit a noticeably higher rate of uncorrectable memory errors than conventional volatile memory (e.g., DRAM or SRAM). In addition, with byte-addressable persistent memory, the mapping of the VM's guest memory pages to physical memory pages on source host system H1 may persist across host reboots. This means that the occurrence of a single uncorrectable memory error in the physical memory underlying the VM's guest memory may render the VM immobile for the entirety of the VM's lifetime.

DETAILED DESCRIPTION

Figure 1:
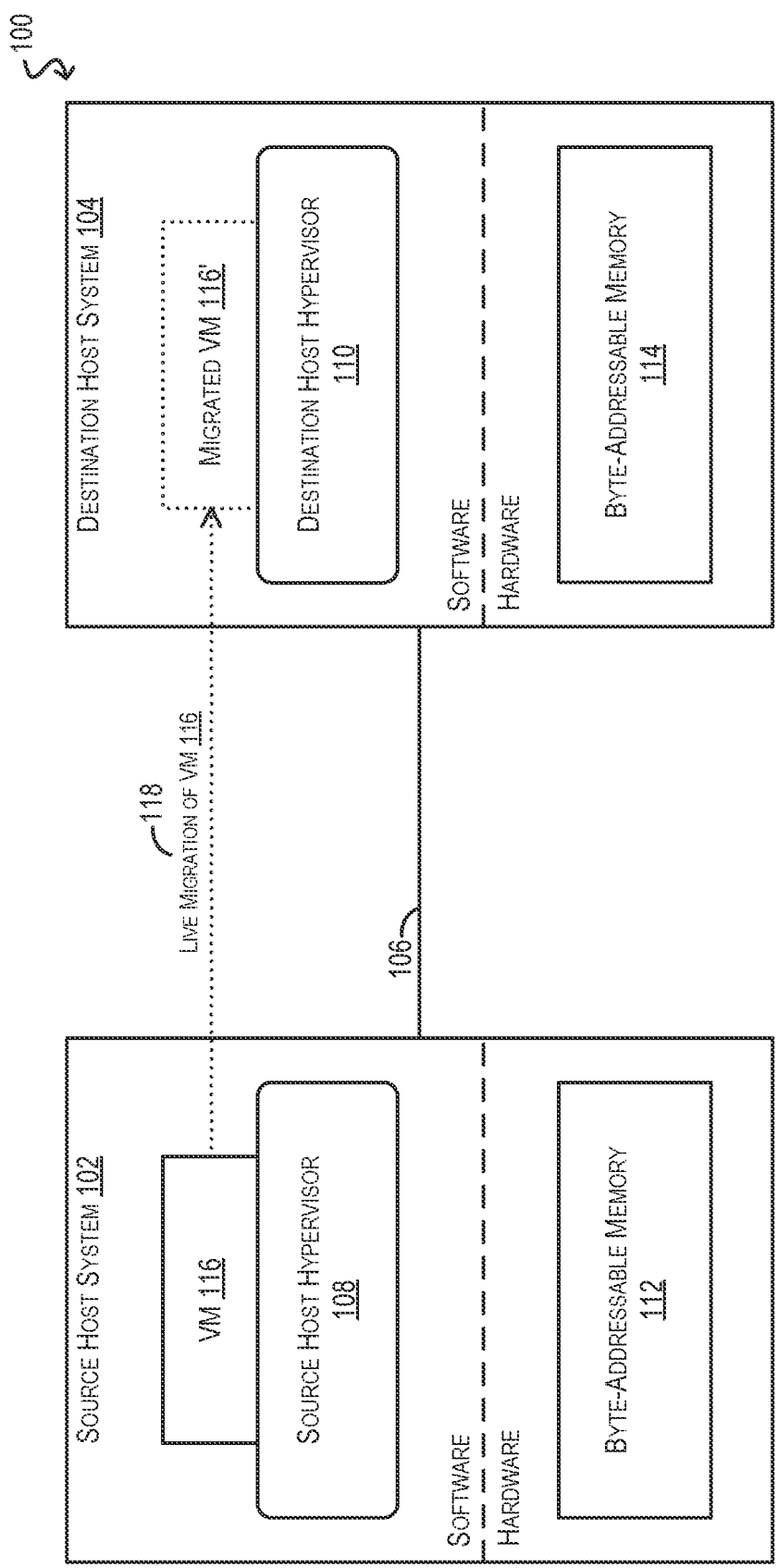
FIG. 1 depicts a system environment in which embodiments of the present disclosure may be implemented.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques for migrating (and more particularly, live migrating) a VM from a source host system H1 to a destination host system H2 in the case where one or more guest memory pages of the VM are impacted by uncorrectable memory errors on source host system H1. As used herein, an "uncorrectable memory error" is an error in the physical memory of a computer system (such as, e.g., a byte-addressable persistent memory or a byte-addressable volatile memory) that is detected by the system's CPU and cannot be corrected in hardware, which means that the data stored in the memory address range of the error is corrupted and unrecoverable. A VM's guest memory page is said to be "impacted" by an uncorrectable memory error if the guest memory page is mapped to a physical memory page which is detected as having that uncorrectable memory error.

In one set of embodiments, the hypervisor of source host system H1 (i.e., the source host hypervisor) can read the VM's guest memory pages in a "memory exception-safe" manner as part of copying those guest memory pages to destination host system H2 during the live migration process. In other words, the source host hypervisor can read each guest memory page in a way that prevents the live migration process from failing or the hypervisor from crashing if the CPU of source host system H1 raises a memory exception indicating that the requested guest memory page is impacted by an uncorrectable memory error. If such a memory exception is raised at the time of reading the guest memory page (or if a prior memory exception was raised with respect that page), the source host hypervisor can transmit error metadata to destination host system H2 indicating that the guest memory page is corrupted and can continue with the live migration.

Then, once the VM has been migrated, the hypervisor of destination host system H2 (i.e., the destination host hypervisor) can use the error metadata received from the source host hypervisor to simulate, for the guest operating system (OS) of the migrated VM, the uncorrectable memory error behavior from the source host side on the destination host side. For example, if the guest OS of the migrated VM attempts to read or write a guest memory page that was identified as being corrupted by the source host hypervisor at the time of being copied over from source host system H1, the destination host hypervisor can recognize this and generate a virtual memory exception notifying the guest OS that the page is corrupted (even though the underlying physical memory page on destination host system H2 may not have any uncorrectable memory errors). The guest OS can then take an appropriate action based on the virtual memory exception, such as kill the guest application that originated the memory read/write request.

With the general approach above, VMs that are impacted by uncorrectable memory errors can be successfully live migrated across host systems, thereby ensuring that the important benefits of live migration are retained for those VMs. At the same time, because uncorrectable memory errors detected on the source host side are simulated on the destination host side via virtual memory exceptions, the guest OS of each migrated VM can maintain a consistent view of the status of its guest memory pages post-migration. The foregoing and other aspects of the present disclosure are described in further detail in the sections that follow.

2. System Environment

FIG. 1 depicts a system environment 100 in which embodiments of the present disclosure may be implemented. As shown, system environment 100 includes a first (source) host system 102 that is communicatively coupled with a second (destination) host system 104 via a network link 106. In one set of embodiments, host systems 102 and 104 may be part of a host cluster comprising a multitude of interconnected host systems, such as a host cluster in an enterprise or cloud computing deployment.

Each host system 102/104 includes, in software, a hypervisor 108/110 (i.e., source host hypervisor 108 and destination host hypervisor 110 respectively) that provides an execution environment for running one or more VMs. In addition, each host system 102/104 includes, in hardware, a byte-addressable memory 112/114 that serves as a backing medium for the working memory (i.e., guest memory) of each VM. In one set of embodiments, byte-addressable memories 112 and 114 may be implemented using a byte-addressable persistent memory, which is an emerging type of computer memory that allows data to be read from or written to the memory at byte granularity (like conventional volatile memory) but is non-volatile in nature (like conventional storage). In other embodiments, byte-addressable memories 112 and 114 may be implemented using a byte-addressable volatile memory such as DRAM or SRAM.

In FIG. 1, it is assumed that at some point in time a VM 116 running on source host system 102 is live migrated to destination host system 104. This live migration process, which is indicated via reference numeral 118, generally involves copying the memory state of VM 116 from source host system 102 to destination host system 104 over network link 106 while VM 116 continues running. When the majority of VM 116's memory state has been copied over, VM 116 is suspended on the source host side and a new (i.e., migrated) VM 116' is powered-on on the destination host side. Migrated VM 116' then resumes execution of the guest workload/operations of original VM 116 on destination host system 104 using the copied memory state.

Figure 2:
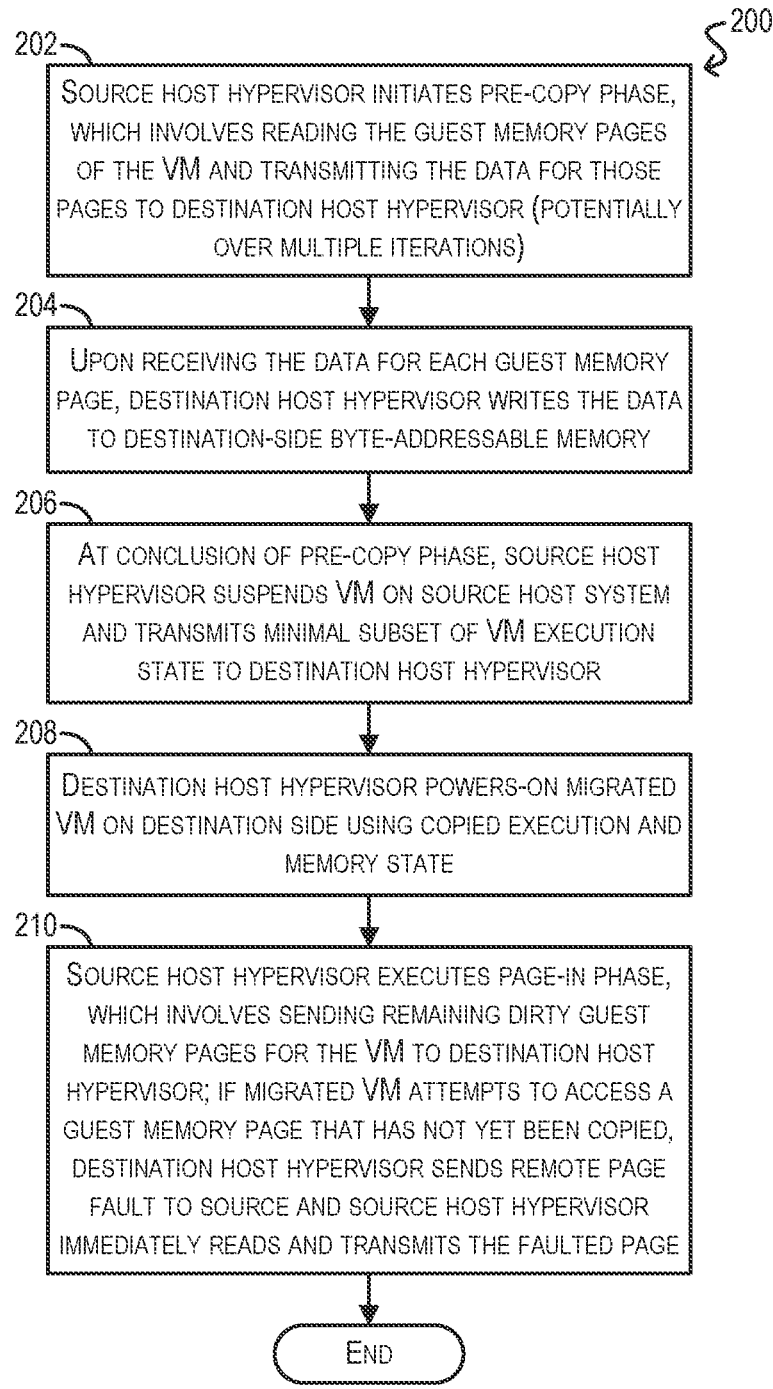
FIG. 2 depicts a conventional live migration workflow.

FIG. 2 depicts a workflow 200 that provides additional details on how VM 116 may be live migrated from source host system 102 to destination host system 104 according to a traditional implementation. Starting with block 202, source host hypervisor 108 can initiate a migration pre-copy phase in which hypervisor 108 reads the guest memory pages of VM 116 from byte-addressable memory 112 and transmits the data of those guest memory pages to destination host hypervisor 110 while VM 116 continues running on source host system 102. Upon receiving the data for each guest memory page, destination host hypervisor 110 can write the data to destination-side byte-addressable memory 114 (block 204). Although not explicitly shown in FIG. 2, this pre-copy phase can proceed according to multiple iterations: an initial iteration in which all of VM 116's guest memory pages are copied over to destination host system 104, and zero or more subsequent iterations in which any guest memory pages dirtied (i.e., written to) by VM 116's guest OS since the previous pre-copy iteration are copied over again. These subsequent pre-copy iterations can continue until some criterion is met (e.g., the rate of re-copied memory pages exceeds the page dirtying rate).

At the conclusion of the pre-copy phase, source host hypervisor 108 can suspend VM 116 on source host system 102 and transmit a minimal subset of the VM's current execution state (e.g., CPU state and registers) to destination host hypervisor 110 (block 206). Destination host hypervisor 110 can then power-on migrated VM 116' on destination host system 104, which causes migrated VM 116' to begin running using the execution and memory state copied over in the previous steps (block 208).

Concurrently with block 208, source host hypervisor 108 can execute a post-migration page-in phase during which source host hypervisor 108 sends to destination host hypervisor 110 any remaining dirty guest memory pages for VM 116 that were not copied over during the pre-copy phase (block 210). As part of this page-in phase, if the guest OS of migrated VM 116' attempts to access a guest memory page on the destination host side that has not yet been received from source host system 102, destination host hypervisor 110 can generate and send a remote page fault to source host hypervisor 108 identifying that guest memory page. In response, source host hypervisor 108 can immediately read and send the faulted guest memory page to destination host hypervisor 110 for consumption by migrated VM 116'.

Finally, once all of the remaining dirty memory pages of VM 116 have been copied over per block 210, the live migration process is considered complete and workflow 200 can end.

As noted in the Background section, one issue with the traditional live migration workflow shown in FIG. 2 and described above is that, if one or more uncorrectable memory errors are present/detected in the portion of byte-addressable memory 112 backing the guest memory of VM 116 on source host system 102, the live migration of VM 116 will fail (and source host hypervisor 108 may possibly crash). For example, the following table presents five different scenarios in which the guest memory pages of VM 116 may be determined to be impacted by uncorrectable memory errors throughout the live migration process and the resulting outcome of each scenario with traditional live migration (i.e., either migration failure or hypervisor crash):

TABLE 1

| Scenario # | Scenario description | Outcome with traditional live migration |
|---|---|---|
| 1 | Prior to the pre-copy phase, one or more guest memory pages of VM 116 are marked by source host hypervisor 108 as being impacted by uncorrectable memory error(s) by virtue of previous "unconsumed" memory exception(s) raised by source host CPU (i.e., memory exception(s) detected via a CPU "patrol | Live migration of VM 116 fails |

TABLE 1-continued

| Scenario # | Scenario description | Outcome with traditional live migration |
|---|---|---|
| | scrubber" process configured to verify the integrity of byte-addressable memory 112 in the background) | |
| 2 | During the pre-copy phase, source host hypervisor 108 becomes aware that a guest memory page of VM 116 is impacted by an uncorrectable memory error via an unconsumed memory exception raised by the source host CPU | Live migration of VM 116 fails |
| 3 | During the pre-copy phase, source host hypervisor 108 attempts to read a guest memory page of VM 116 that is impacted by an uncorrectable memory error, which causes the source host CPU to raise a "consumed" memory exception (i.e., a memory exception generated in response to an explicit read/write request) | Source host hypervisor 108 crashes |
| 4 | During the pre-copy phase, VM 116's guest OS attempts to read or write a guest memory page that is impacted by an uncorrectable memory error, which causes the source host CPU to raise a consumed memory exception | Live migration of VM 116 fails |
| 5 | During the page-in phase, in response to a remote page fault, source host hypervisor 108 attempts to read a guest memory page of VM 116 that is impacted by an uncorrectable memory error, which causes the source host CPU to raise a consumed memory exception | Source host hypervisor 108 crashes |

The various failure/crash outcomes illustrated in Table 1 are particularly problematic in cases where byte-addressable memory 112 of source host system 102 is implemented using a byte-addressable persistent memory such as PCM, ReRAM, etc., which is becoming increasingly common in large-scale virtualized deployments. This is due to (1) the relatively higher uncorrectable memory error rate for currently available byte-addressable persistent memory technologies in comparison to conventional DRAM/SRAM, and (2) the possibility for VM 116's guest memory to host physical memory mappings to be persisted across host reboots, which can cause a single uncorrectable memory error to render the VM immobile (i.e., incapable of being migrated away from source host system 102) for its entire lifetime.

Figure 3:
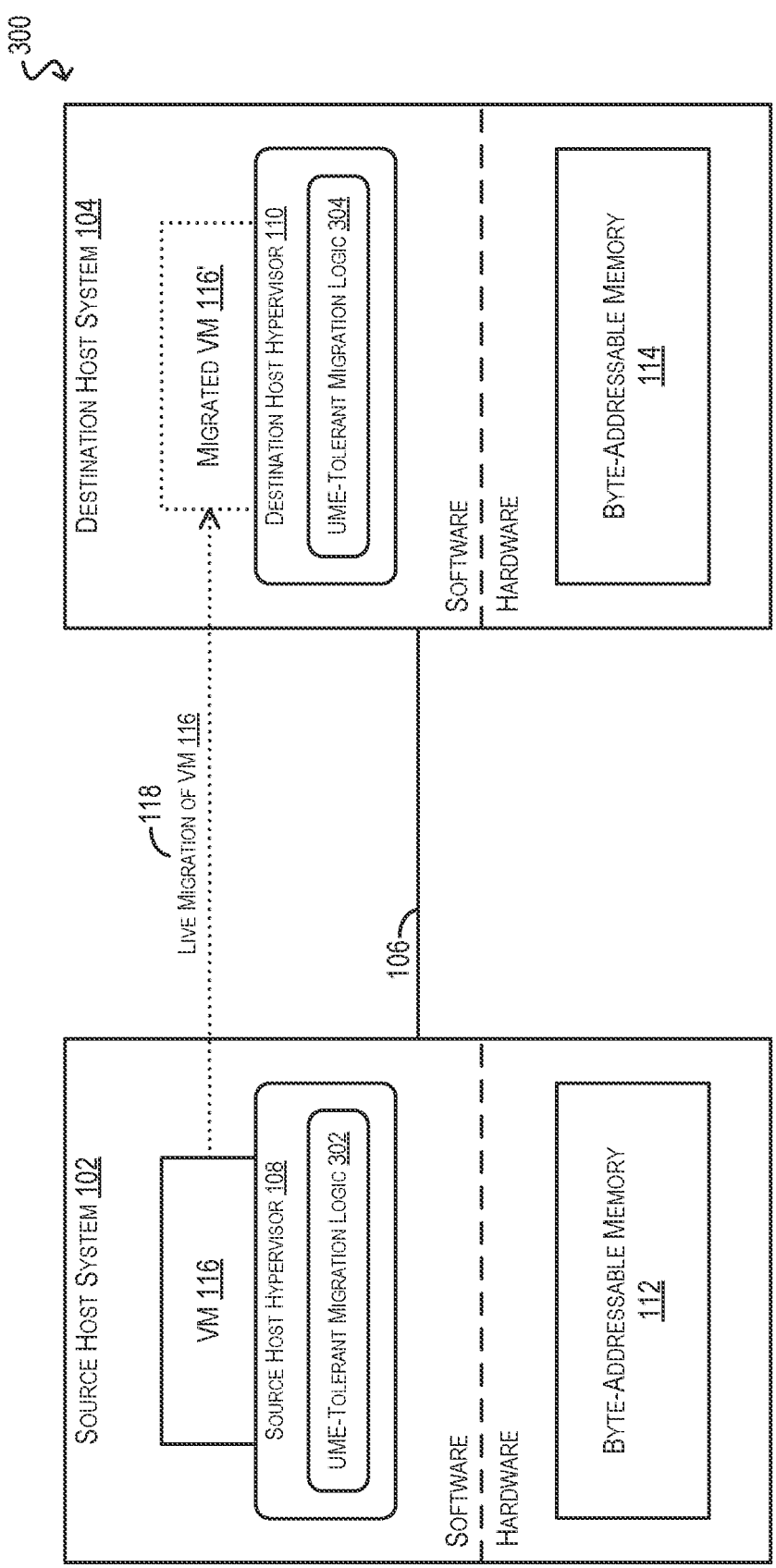
FIG. 3 depicts an enhanced version of the system environment of FIG. 1 according to certain embodiments.

To address the foregoing and other similar issues, FIG. 3 depicts an enhanced version of system environment 100 of FIG. 1 (i.e., system environment 300) that includes, in source and destination host hypervisors 108 and 110 respectively, a novel uncorrectable memory error (UME)-tolerant migration logic component 302/304. At a high level, components 302 and 304 can enable hypervisors 108 and 110 to successfully live migrate VMs like VM 116 from source host system 102 to destination host system 104, despite the presence of uncorrectable memory errors in the source-side physical memory (i.e., byte-addressable memory 112) backing the VM's guest memory at the time of migration.

For example, with respect to source host hypervisor 108, UME-tolerant migration logic 302 can allow hypervisor 106 to read the guest memory pages of VM 116 in a memory exception-safe manner during the live migration process, such that the process does not fail, and source host hypervisor 108 does not crash, if a particular guest memory page is determined to be impacted by an uncorrectable memory error (via, e.g., the receipt of a consumed or unconsumed memory exception). Instead, for any guest memory pages that are determined to be impacted by uncorrectable memory errors, source host hypervisor 108 can generate and send error metadata to destination host hypervisor 110 identifying that guest memory page as being corrupted (in certain embodiments, source host hypervisor 108 may alternatively send a specific address range within the guest memory page that is affected by the error, along with data for the portions of the page that remain unaffected; this is discussed in section (3) below).

To illustrate this, Table 2 below presents the five uncorrectable memory error scenarios from Table 1 and the behavior of source host hypervisor 108 in these scenarios with UME-tolerant migration logic 302 according to certain embodiments. As shown, source host hypervisor 108 is able to successfully handle the uncorrectable memory errors found in each scenario and allow the live migration process to proceed.

TABLE 2

| Scenario # | Scenario description | Behavior of source host hypervisor 108 with UME-tolerant migration logic 302 |
|---|---|---|
| 1 | Prior to the pre-copy phase, one or more guest memory pages of VM 116 are marked by source host hypervisor 108 as being impacted by uncorrectable memory error(s) by virtue of previous "unconsumed" memory exception(s) raised by source host CPU (i.e., memory | For each of the one or more guest memory pages, source host hypervisor 108 transmits, during the initial pre-copy iteration, error metadata to destination host hypervisor |

TABLE 2-continued

| Scenario # | Scenario description | Behavior of source host hypervisor 108 with UME-tolerant migration logic 302 |
|---|---|---|
| | exception(s) detected via a CPU "patrol scrubber" process configured to verify the integrity of byte-addressable memory 112 in the background) | 108 identifying the page as corrupted |
| 2 | During the pre-copy phase, source host hypervisor 108 becomes aware that a guest memory page of VM 116 is impacted by an uncorrectable memory error via an unconsumed memory exception raised by the source host CPU | If the unconsumed memory exception is raised before the guest memory page is copied via the initial pre-copy iteration, source host hypervisor 108 transmits error metadata to destination host hypervisor 108 identifying the page as corrupted during the initial pre-copy iteration<br>If the unconsumed memory exception is raised after the guest memory page has been copied via the initial pre-copy iteration and VM 116's guest OS has not attempted to re-access the page since the initial pre-copy iteration, no action is taken<br>If the unconsumed memory exception is raised after the guest memory page has been copied via the initial pre-copy iteration and the page has been dirtied by VM 116's guest OS since the initial pre-copy iteration, source host hypervisor 108 transmits error metadata to destination host hypervisor 108 identifying the page as corrupted during a subsequent pre-copy iteration |
| 3 | During the pre-copy phase, source host hypervisor 108 attempts to read a guest memory page of VM 116 that is impacted by an uncorrectable memory error, which causes the source host CPU to raise a "consumed" memory exception (i.e., a memory exception generated in response to an explicit read/write request) | Source host hypervisor 108 transmits error metadata to destination host hypervisor 108 identifying the guest memory page as corrupted |
| 4 | During the pre-copy phase, VM 116's guest OS attempts to read or write a guest memory page that is impacted by an uncorrectable memory error, which causes the source host CPU to raise a consumed memory exception | Source host hypervisor 108 transmits error metadata to destination host hypervisor 108 identifying the guest memory page as corrupted |
| 5 | During the page-in phase, in response to a remote page fault, source host hypervisor 108 attempts to read a guest memory page of VM 116 that is impacted by an uncorrectable memory error, which causes the source host CPU to raise a consumed memory exception | Source host hypervisor 108 transmits error metadata to destination host hypervisor 108 identifying the guest memory page as corrupted via the remote page fault return message |

With respect to destination host hypervisor 110, once VM 116 is migrated and operational on destination host system 104 in the form of migrated VM 116', UME-tolerant migration logic 304 can allow hypervisor 110 to simulate the uncorrectable memory errors present on source host system 102 (and identified via the error metadata sent by source host hypervisor 108) on the destination host side. This memory error simulation ensures that the migrated VM's understanding of the statuses of its guest memory pages (in other words, which memory pages are valid and which memory pages are corrupted) post-migration remains consistent with its understanding of those page statuses pre-migration. For example, if the guest OS of migrated VM 116' attempts to read or write a guest memory page that is impacted by an uncorrectable memory error per the error metadata transmitted by source host hypervisor 108, destination host hypervisor 110 can generate a virtual memory exception for the guest OS indicating that the page is corrupted (even though there may be no real uncorrectable memory error affecting that guest memory page on destination host system 104). As another example, if the guest OS of migrated VM 116' sends an ACPI (Advanced Configuration and Power Interface) query to the VM's virtual BIOS requesting a list of guest memory pages with uncorrectable memory errors, destination host hypervisor 110 can include in the returned list all of the guest memory pages identified as corrupted by source host hypervisor 108.

The remaining sections of the present disclosure describe specific workflows that may be carried out by source host hypervisor 108 and destination host hypervisor 110 (in accordance with their respective UME-tolerant migration logic components 302 and 304) for successfully live migrating VM 116 in the face of uncorrectable memory errors and simulating those errors on the destination host side according to various embodiments. It should be appreciated that the system environment and high-level solution approach presented above are illustrative and not intended to limit embodiments of the present disclosure. For example, although the foregoing solution description focuses on supporting the live migration of VM 116, in some embodiments the same concepts can also be applied to a cold migration of VM 116—in other words, a situation where VM 116 is migrated from source host system 102 to destination host system 104 while the VM is in a powered-off state. In such a cold migration, with existing implementations, if the VM's guest memory state is maintained in byte-addressable persistent memory on source host system 102 and that memory exhibits one or more uncorrectable memory errors, the cold migration will fail (or source host hypervisor 108 will crash) in a manner similar to live migration. Thus, for the cold migration use case, a similar solution approach of reading the guest memory in a memory exception-safe way on source host system 104, transmitting error metadata identifying the corrupted guest memory portions to destination host system 104, and simulating the errors on the destination side can be employed. This cold migration use case is discussed in further detail in section (5) below.

3. Copying Guest Memory Pages from Source Host to Destination Host

Figure 4:
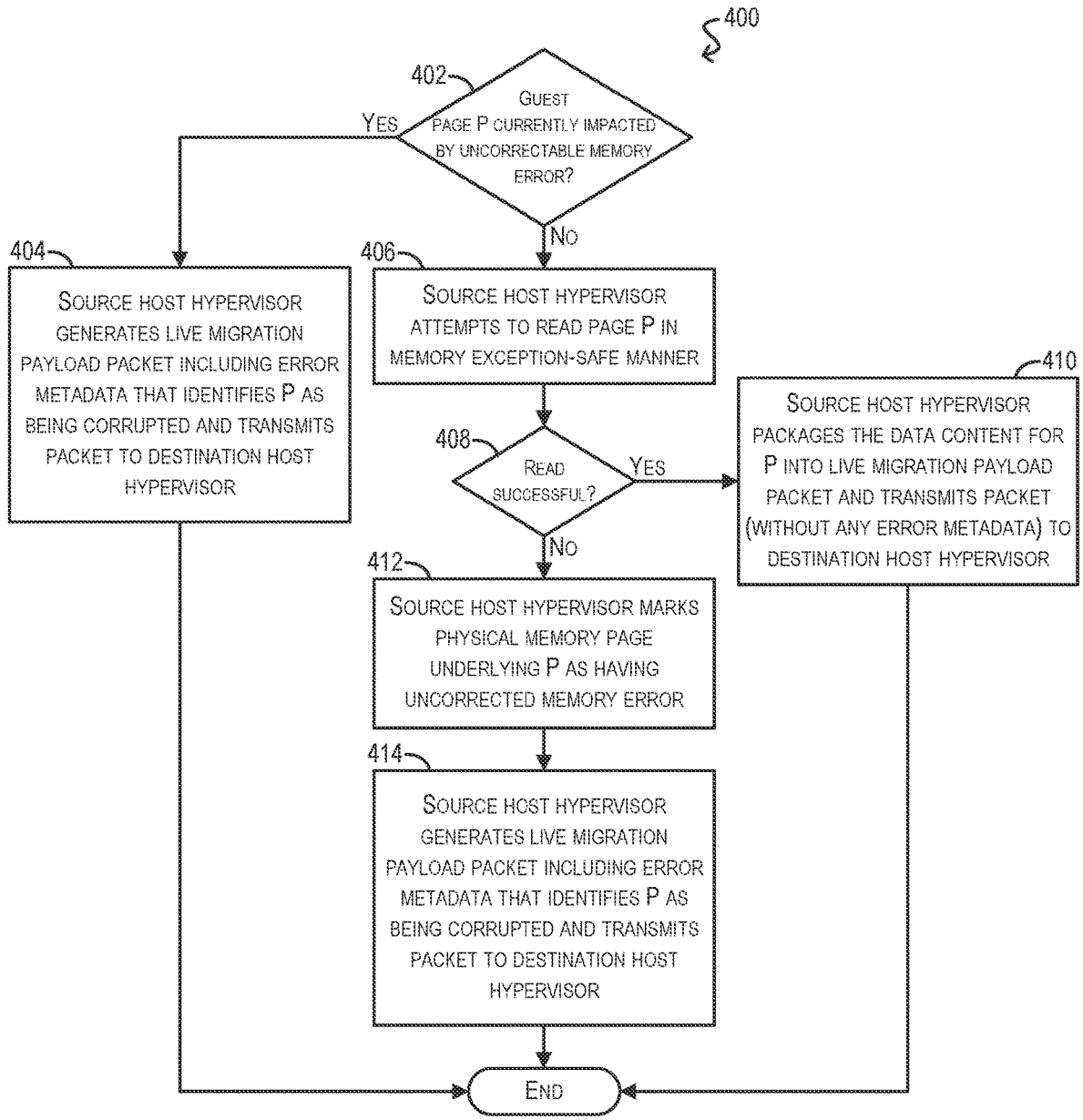
FIG. 4 depicts a workflow for copying a guest memory page of a VM from a source host system to a destination host system as part of live migrating the VM according to certain embodiments.

FIG. 4 depicts a workflow 400 that may be executed by source host hypervisor 108 of FIG. 3 (in accordance with its UME-tolerant migration logic 302) for copying, to destination host system 104, a given guest memory page P of VM 116 during the live migration of VM 116 according to certain embodiments. Source host hypervisor 108 may carry out workflow 400 at multiple time points within the live migration process: (1) during the initial pre-copy iteration, (2) during each subsequent pre-copy iteration, and (3) during the page-in phase. With regard to (1) (initial pre-copy iteration), source host hypervisor 108 can carry out workflow 400 for every guest memory page of VM 116 in order to transfer an initial version of the VM's entire guest memory state to destination host system 104. With regard to (2) (subsequent pre-copy iterations), source host hypervisor 108 can carry out workflow 400 for each guest memory page that has been either (a) dirtied by the VM's guest OS since the last pre-copy iteration, or (b) has been accessed by the guest OS in manner that has triggered a consumed memory exception (per scenario (4) of Table 2). And with respect to (3) (page-in phase), source host hypervisor 108 can carry out workflow 400 for each guest memory page that is identified in a remote page fault sent by destination host hypervisor 110.

Starting with block 402, source host hypervisor 108 can check whether guest memory page P is currently impacted by an uncorrectable memory error. In one set of embodiments, this step can involve consulting a data structure maintained by hypervisor 108 that keeps track of the physical memory pages within byte-addressable memory 112 which source host CPU has previously reported (via consumed or unconsumed memory exceptions) as having uncorrectable memory errors and determining whether guest memory page P is mapped to a physical memory page with an uncorrectable error in that data structure.

If the answer at block 402 is yes, source host hypervisor 108 can generate a live migration payload packet that includes error metadata identifying guest memory page P as corrupted (i.e., impacted by an uncorrectable memory error) and transmit the packet to destination host hypervisor 110 (block 404).

On the other hand, if the answer at block 402 is no, source host hypervisor 108 can attempt to read the data content of guest memory page P from byte-addressable memory 112 in a memory exception-safe manner (block 406). If this read operation is successful (i.e., no consumed memory exception is raised by the source host CPU), source host hypervisor 108 can package the data content of guest memory page P into a live migration payload packet (without any error metadata) and transmit the packet to destination host hypervisor 110 (blocks 408 and 410).

Finally, if the read operation causes source host CPU to raise a consumed memory exception (which indicates that guest memory page P is impacted by a previously undetected uncorrectable memory error), source host hypervisor 108 can mark the physical memory page underlying guest memory page P as being impacted in its tracking data structure (block 412), generate a live migration payload packet that includes error metadata identifying P as corrupted, and transmit the packet to destination host hypervisor 110 (block 414).

Figure 5:
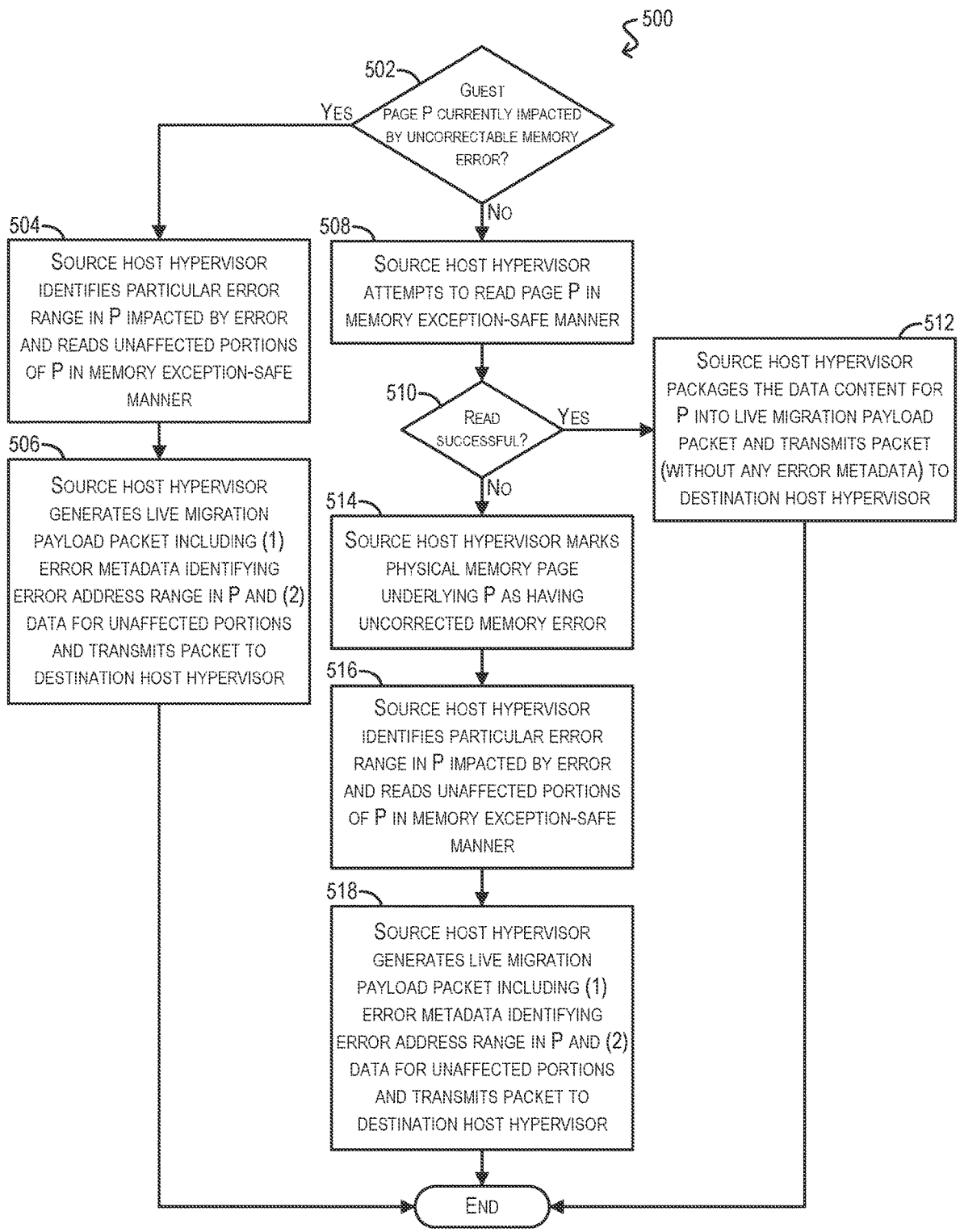
FIG. 5 depicts another workflow for copying a guest memory page of a VM from a source host system to a destination host system as part of live migrating the VM according to certain embodiments.

It should be appreciated that workflow 400 is illustrative and various modifications are possible. For example, in many cases an uncorrectable memory error may affect a relatively small percentage of a physical memory page (such as a few CPU cache lines' worth of data within the page). In these cases, a large portion of the data in a guest memory page that is impacted by such an error will still be valid and can be copied over to destination host system 104. To account for this, FIG. 5 depicts a modified version of workflow 400 (i.e., workflow 500) that involves copying partial page data where possible. The general structure of workflow 500 is similar to workflow 400; however, at each point where source host hypervisor 108 sends error metadata for guest memory page P to destination host hypervisor 110, source host hypervisor 108 can take the additional steps of: identifying the particular address range (e.g., offset and length) within the underlying physical memory page that exhibits the uncorrectable memory error, reading the unaffected portions of page P in a memory exception-safe manner, and including in the live migration payload packet both (1) error metadata identifying the error address range within P and (2) data for the unaffected page portions (blocks 504-506 and 516-518). In this way, source host hypervisor 108 can communicate the uncorrectable memory errors found on source host system 102 to destination host hypervisor 110 in a significantly more fine-grained manner.

Figure 6:
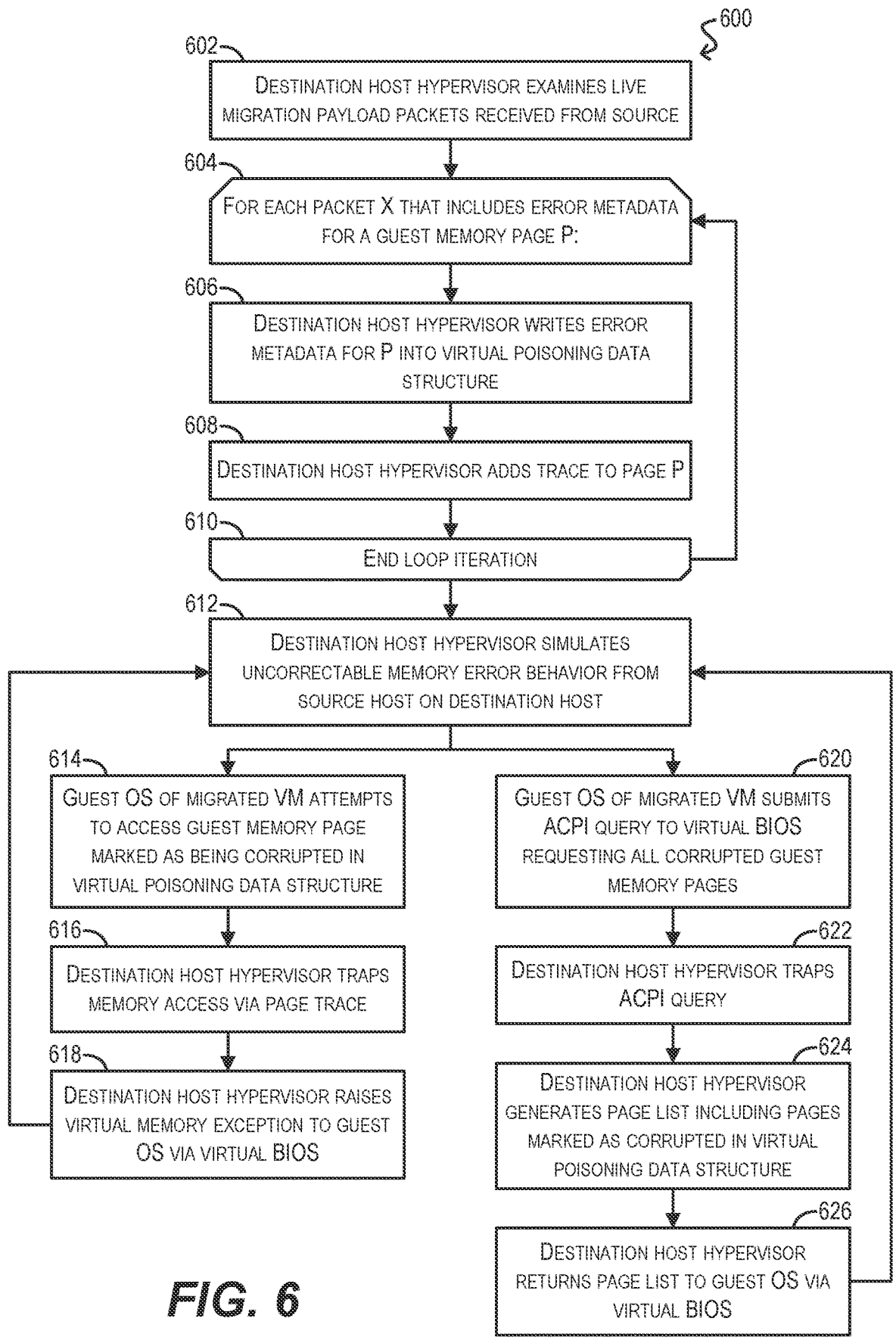
FIG. 6 depicts a workflow for processing error metadata received from a source host system on a destination host system and simulating uncorrectable error behavior on the destination host system based on the error metadata according to certain embodiments.

4. Processing Received Error Metadata and Simulating Uncorrectable Memory Error Behavior on Destination Host Side FIG. 6 depicts a workflow 600 that may be executed by destination host hypervisor 110 of FIG. 3 (in accordance with its UME-tolerant migration logic 304) for processing the per-page error metadata transmitted by source host hypervisor 108 as part of the live migration of VM 116 and leveraging that error metadata to simulate the uncorrectable memory error behavior of source host system 102 on destination host system 104 according to certain embodiments. Workflow 600 assumes that source host hypervisor 108 has sent (or in the process of sending) live migration payload packets for VM 116 to destination host hypervisor 110 per workflow 400 or workflow 500.

At blocks 602 and 604, destination host hypervisor 110 can examine the live migration payload packets received from source host hypervisor 108 and enter a loop for each packet X that includes error metadata for a corresponding guest memory page P of VM 116. Within this loop, destination host hypervisor 110 can write the error metadata for page P included in packet X to a local "virtual poisoning" data structure configured to keep track of the guest memory pages of VM 116 that are impacted by uncorrectable memory errors on the source host side (block 606). For example, if the error metadata received for page P indicates that the entirety of the page is corrupted (per workflow 400), destination host hypervisor 110 can mark that entire page as being corrupted in the virtual poisoning data structure at block 606. Alternatively, if the error metadata received for page P specifies that a particular address range within the page is corrupted (per workflow 500), destination host hypervisor 110 can mark that particular address range of page P as being corrupted in the virtual poisoning data structure at block 606. In certain embodiments, the virtual poisoning data structure may be maintained on a non-volatile storage/memory medium of destination host system 104, such as a persistent disk or persistent memory of the host system, in order to ensure that it can be retrieved in the case where the destination host system is power cycled.

In addition, at block 608, destination host hypervisor 110 can add a "trace" to guest memory page P on the destination host side, which allows hypervisor 110 to trap guest OS read/write requests to that page.

Upon processing all of the live migration payload packets sent by source host hypervisor 108 that include error metadata (block 610), destination host hypervisor 110 can begin simulating the uncorrectable error behavior of source host system 102 with respect to migrated VM 116' (block 612). For example, assume that the guest OS of migrated VM 116' attempts to access a guest memory page that has been marked as being corrupted (or as containing a corrupted address range) in the virtual poisoning data structure (block 614). In this scenario, destination host hypervisor 110 can trap the memory access via the page trace added at block 608 (block 616) and raise a virtual memory exception to the guest OS via, e.g., the migrated VM's virtual BIOS, thereby informing the guest OS that the requested memory page (or a portion thereof) is corrupted (block 618). In response, the guest OS can take some action for handling the virtual memory exception, such as killing the guest application that originated the request (not shown), and destination host hypervisor 110 can return to block 612 in order to continue its memory error simulation.

Alternatively, assume that the guest OS of migrated VM 116' submits an ACPI query to the VM's virtual BIOS requesting a list of all guest memory pages with uncorrectable memory errors (block 620). In this scenario, destination host hypervisor 110 can trap the ACPI query (block 622), generate a page list that includes the guest memory pages marked as corrupted in the virtual poisoning data structure (block 624), and communicate that page list via the virtual BIOS to the guest OS (block 626). Destination host hypervisor 110 can then return to block 612 as indicated above to continue the simulation.

5. Handling Cold Migration

Because of the non-volatile nature of byte-addressable persistent memory, in cases where byte-addressable memory 112 of source host system 102 is implemented using such a persistent memory, it is possible for VM 116 to be cold migrated (in addition to, or in lieu of, being live migrated) from source host system 102 to destination host system 104. This cold migration process generally involves representing the guest memory state of VM 116 as a virtual disk (VMDK) image file on source host system 102 and transferring this VMDK file, using a block-based network file copy (NFC) protocol, to destination host system 104.

Figure 7:
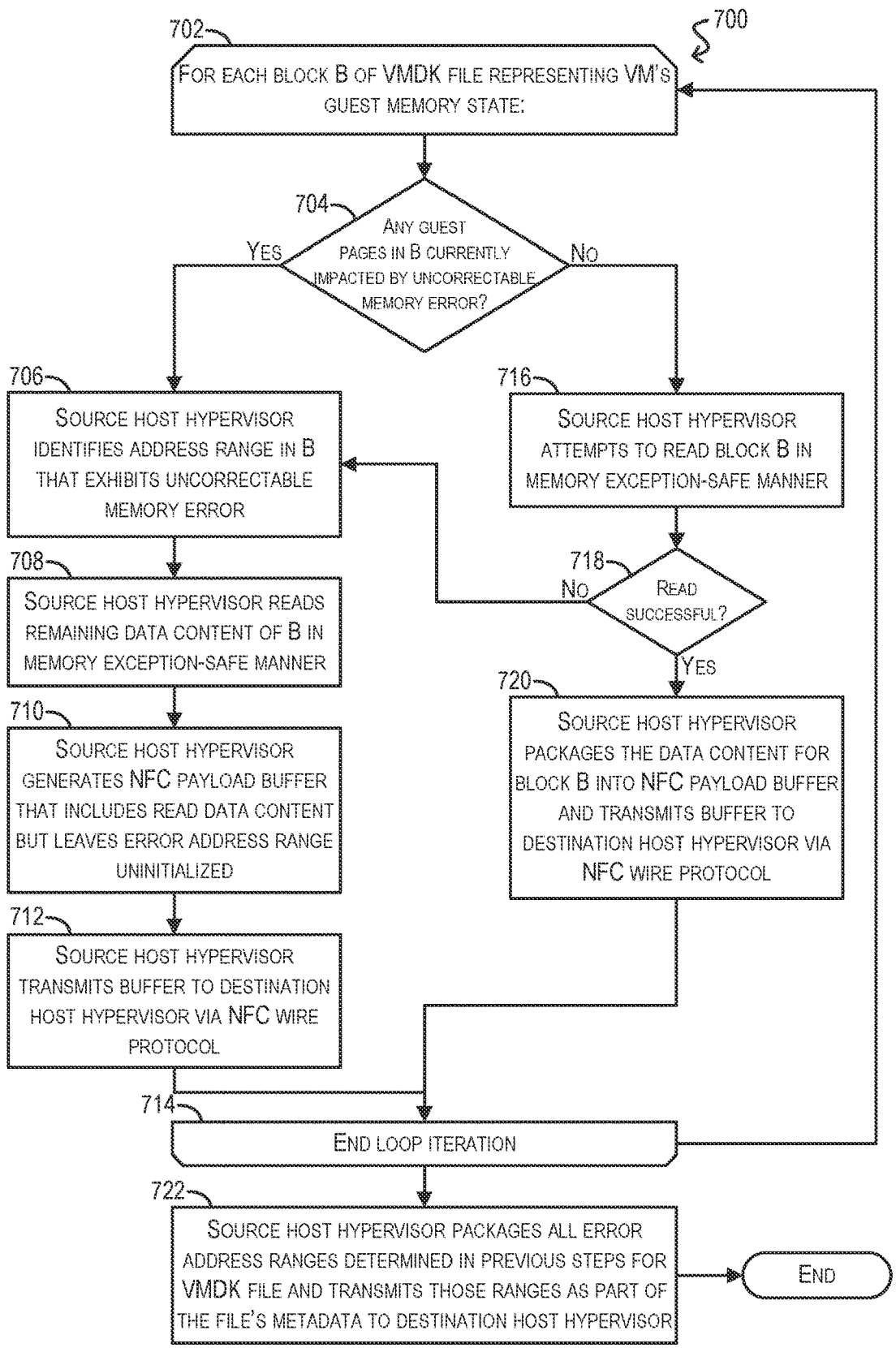
FIG. 7 depicts a workflow for handling cold migration of a VM according to certain embodiments.

With existing cold migration implementations, at the time of reading a given block of the VMDK image file on the source side via the NFC protocol, source host hypervisor 108 will attempt to read the physical memory pages mapped to that block on the byte-addressable persistent memory and if any of those physical memory pages are impacted by an uncorrectable memory error, the cold migration will fail (and the hypervisor may crash). To avoid these problems, FIG. 7 depicts a workflow 700 that may be executed by source host hypervisor 108 for supporting the cold migration of VM 116 in the face of uncorrectable memory errors according to certain embodiments.

It should be noted that a similar approach can be used to support the cloning of VM 116 in the face of uncorrectable memory errors, which involves creating a copy of the VM and registering the copy as a new VM on the same host system or a different host system. When a VM is cloned, the information regarding the uncorrectable memory errors impacting the guest memory space of that VM can be propagated to the cloned copy via, e.g., workflow 700 of FIG. 7.

Starting with block 702, source host hypervisor 108 can enter a loop for each block B of the VMDK file representing VM 116's guest memory state. Within this loop, source host hypervisor 108 can check whether any of the guest memory pages falling within the address range of block B are currently impacted by a uncorrectable memory error (block 704).

If the answer at block 704 is yes, source host hypervisor 108 can identify the particular address range in block B that exhibits the uncorrectable memory error (block 706), read the remaining data content of the block in a memory exception-safe manner (block 708), generate a NFC payload buffer that includes the read data content but leaves the error address range uninitialized (block 710), transmit the buffer to destination host hypervisor 110 via the NFC wire protocol (block 712), and proceed to the end of the current loop iteration (block 714).

On the other hand, if the answer at block 704 is no, source host hypervisor 108 can attempt to read the data content of block B from the byte-addressable persistent memory in a memory exception-safe manner (blocks 716 and 718). If this read operation is successful (i.e., no consumed memory exception is raised by the source host CPU), source host hypervisor 108 can package the read data content of block B into an NFC payload buffer, transmit the buffer to destination host hypervisor 110 via the NFC wire protocol (block 720), and proceed to the end of the current loop iteration (block 714).

If the read operation causes source host CPU to raise a consumed memory exception, source host hypervisor 108 can execute blocks 706-714 noted above. Finally, at the conclusion of the cold migration, source host hypervisor 108 can collect all of the error address ranges determined in the previous steps for the VMDK file of VM 116 and transmit those error address ranges as part of the file's metadata to destination host hypervisor 110 (block 722). Although not explicitly shown in FIG. 7, upon receiving the error address ranges from source host hypervisor 108, destination host hypervisor 110 can add the error address ranges to a virtual poisoning data structure and use this virtual poisoning data structure to simulate the uncorrectable memory behavior of source host system 102 on destination host system 104 with respect to the migrated VM in a manner that is substantially similar to workflow 600 of FIG. 6.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising, at a time of executing a live migration of a virtual machine (VM) from a source host system to a destination host system:
    determining, by a source hypervisor running on the source host system, that a guest memory page of the VM is mapped to a physical memory page of the source host system having an uncorrectable memory error; and
    in response to the determining, transmitting, by the source hypervisor to a destination hypervisor running on the destination host system, error metadata identifying the guest memory page as being at least partially corrupted.

2. The method of claim 1 wherein the determining is performed prior to a pre-copy phase of the live migration, and
    wherein the transmitting is performed during an initial iteration of the pre-copy phase.

3. The method of claim 1 wherein the determining is performed during a pre-copy phase of the live migration, before the guest memory page has been copied to the destination host system as part of an initial iteration of the pre-copy phase, and
    wherein the transmitting is performed during the initial iteration.

4. The method of claim 1 wherein the determining is performed during a pre-copy phase of the live migration, after the guest memory page has been copied to the destination host system as part of an initial iteration of the pre-copy phase,
    wherein the guest memory page is dirtied by a guest operating system (OS) of the VM after the initial iteration, and
    wherein the transmitting is performed during a subsequent iteration of the pre-copy phase after the initial iteration.

5. The method of claim 1 wherein the determining is in response to a consumed memory exception raised during a pre-copy phase of the live migration.

6. The method of claim 1 wherein the determining is in response to a consumed memory exception raised during a page-in phase of the live migration, and
    wherein the error metadata is transmitted to the destination host system as part of a remote page fault return message.

7. The method of claim 1 wherein upon completion of the live migration of the VM from the source host system to the destination host system, the destination hypervisor simulates the uncorrectable memory error for a guest OS of the migrated VM.

8. A non-transitory computer readable storage medium having stored thereon program code executable by source hypervisor of a source host system, the program code embodying a method comprising, at a time of executing a live migration of a virtual machine (VM) from the source host system to a destination host system:
    determining that a guest memory page of the VM is mapped to a physical memory page of the source host system having an uncorrectable memory error; and
    in response to the determining, transmitting, to a destination hypervisor running on the destination host system, error metadata identifying the guest memory page as being at least partially corrupted.

9. The non-transitory computer readable storage medium of claim 8 wherein the determining is performed prior to a pre-copy phase of the live migration, and wherein the transmitting is performed during an initial iteration of the pre-copy phase.

10. The non-transitory computer readable storage medium of claim 8 wherein the determining is performed during a pre-copy phase of the live migration, before the guest memory page has been copied to the destination host system as part of an initial iteration of the pre-copy phase, and wherein the transmitting is performed during the initial iteration.

11. The non-transitory computer readable storage medium of claim 8 wherein the determining is performed during a pre-copy phase of the live migration, after the guest memory page has been copied to the destination host system as part of an initial iteration of the pre-copy phase, wherein the guest memory page is dirtied by a guest operating system (OS) of the VM after the initial iteration, and wherein the transmitting is performed during a subsequent iteration of the pre-copy phase after the initial iteration.

12. The non-transitory computer readable storage medium of claim 8 wherein the determining is in response to a consumed memory exception raised during a pre-copy phase of the live migration.

13. The non-transitory computer readable storage medium of claim 8 wherein the determining is in response to a consumed memory exception raised during a page-in phase of the live migration, and wherein the error metadata is transmitted to the destination host system as part of a remote page fault return message.

14. The non-transitory computer readable storage medium of claim 8 wherein upon completion of the live migration of the VM from the source host system to the destination host system, the destination hypervisor simulates the uncorrectable memory error for a guest OS of the migrated VM.

15. A source host system comprising:

a source hypervisor;

a memory; and a non-transitory computer readable medium having stored thereon program code executable by the source hypervisor at a time of performing a live migration of a virtual machine (VM) from the source host system to a destination host system, the program code causing the source hypervisor to:

determine that a guest memory page of the VM is mapped to a physical memory page of the memory having an uncorrectable memory error; and in response to the determining, transmit, to a destination hypervisor running on the destination host system, error metadata identifying the guest memory page as being at least partially corrupted.

16. The source host system of claim 15 wherein the determining is performed prior to a pre-copy phase of the live migration, and wherein the transmitting is performed during an initial iteration of the pre-copy phase.

17. The source host system of claim 15 wherein the determining is performed during a pre-copy phase of the live migration, before the guest memory page has been copied to the destination host system as part of an initial iteration of the pre-copy phase, and wherein the transmitting is performed during the initial iteration.

18. The source host system of claim 15 wherein the determining is performed during a pre-copy phase of the live migration, after the guest memory page has been copied to the destination host system as part of an initial iteration of the pre-copy phase, wherein the guest memory page is dirtied by a guest operating system (OS) of the VM after the initial iteration, and wherein the transmitting is performed during a subsequent iteration of the pre-copy phase after the initial iteration.

19. The source host system of claim 15 wherein the determining is in response to a consumed memory exception raised during a pre-copy phase of the live migration.

20. The source host system of claim 15 wherein the determining is in response to a consumed memory exception raised during a page-in phase of the live migration, and wherein the error metadata is transmitted to the destination host system as part of a remote page fault return message.

21. The source host system of claim 15 wherein upon completion of the live migration of the VM from the source host system to the destination host system, the destination hypervisor simulates the uncorrectable memory error for a guest OS of the migrated VM.

* * * * *